(12) United States Patent
Van Ackere et al.

(10) Patent No.: US 8,457,132 B2
(45) Date of Patent: *Jun. 4, 2013

(54) METHOD OF RELAYING TRAFFIC FROM A SOURCE TO A TARGETED DESTINATION IN A COMMUNICATIONS NETWORK AND CORRESPONDING EQUIPMENT

(75) Inventors: Michel Diane Cyriel Van Ackere, Sint-Niklaas (BE); Paul Mathilde Frans Kennis, Wilrijk (BE); Koen Handekyn, Ghent (BE)

(73) Assignee: Alcatel Lucent, Paris (FR)

( * ) Notice: Subject to any disclaimer, the term of this patent is extended or adjusted under 35 U.S.C. 154(b) by 402 days.

This patent is subject to a terminal disclaimer.

(21) Appl. No.: 12/564,502

(22) Filed: Sep. 22, 2009

(65) Prior Publication Data

US 2010/0008367 A1 Jan. 14, 2010

Related U.S. Application Data

(63) Continuation of application No. 10/697,121, filed on Oct. 31, 2003, now Pat. No. 7,610,401.

(30) Foreign Application Priority Data

Dec. 9, 2002 (EP) ..................................... 02360339

(51) Int. Cl.
*H04L 12/56* (2006.01)
(52) U.S. Cl.
USPC ...... 370/395.31; 370/351; 370/389; 370/392; 370/401; 709/240; 709/239
(58) Field of Classification Search
USPC ..... 370/395.31, 351, 401, 389, 392; 709/240, 709/239
See application file for complete search history.

(56) References Cited

U.S. PATENT DOCUMENTS

| 5,867,666 A | 2/1999 | Harvey |
| 5,903,545 A | 5/1999 | Sabourin et al. |
| 6,064,671 A | 5/2000 | Killian |
| 6,101,543 A * | 8/2000 | Alden et al. .................. 709/229 |

(Continued)

OTHER PUBLICATIONS

Chowdhury A. et al.; "Dynamic Routing System (DRS); fault tolerance in network routing;" Computer Networks, Elsevier Science Publishers B.V., Amsterdam, NL, vol. 31, No. 1-2, Jan. 14, 1999, pp. 89-99, XP004304478.

(Continued)

*Primary Examiner* — Andrew Chriss
*Assistant Examiner* — Mohamed Kamara
(74) *Attorney, Agent, or Firm* — Sughrue Mion, PLLC

(57) ABSTRACT

The present invention discloses a method of relaying traffic from a source application (46*a*-46*c*) to a targeted destination in a communications network (14, 16). The method comprises the steps of providing a first and at least one second network adapter, each providing access to a network (14, 16) having a plurality of destinations. Furthermore, a first routing table, which defines a first default destination associated with the first network adapter, is provided. Traffic from the source (46*a*-46*c*) to the targeted destination is relayed using one of the network adapters (20, 22). According to one aspect of the invention, at least one second routing table defining at least one second default destination is provided. Each second network adapter is individually associated with one second default destination. The step of relaying includes the step of selecting one of the first and second routing tables (60, 62).

14 Claims, 2 Drawing Sheets

U.S. PATENT DOCUMENTS

| | | | |
|---|---|---|---|
| 6,529,963 B1 | 3/2003 | Fredin et al. | |
| 6,658,481 B1 | 12/2003 | Basso et al. | |
| 6,704,795 B1 | 3/2004 | Fernando et al. | |
| 6,963,926 B1 | 11/2005 | Robinson | |
| 6,993,034 B1* | 1/2006 | Block et al. | 370/401 |
| 7,610,401 B2* | 10/2009 | Van Ackere et al. | 709/238 |
| 7,619,401 B2* | 11/2009 | Chen et al. | 323/316 |
| 2002/0138578 A1 | 9/2002 | Zhou | |
| 2003/0065816 A1* | 4/2003 | Dharmadhikari et al. | 709/240 |
| 2003/0188018 A1 | 10/2003 | Guerrero et al. | |
| 2004/0013120 A1* | 1/2004 | Shen | 370/395.31 |
| 2004/0034714 A1 | 2/2004 | Garakani et al. | |

OTHER PUBLICATIONS

Aweya J.; "On the design of IP routers Part 1; Router architectures," Journal of Systems Architecture, Elsevier Science Publishers B.V., Amsterdam, NL, vol. 46, No. 6, Apr. 2000, pp. 483-511, XP004190486.

* cited by examiner

METHOD OF RELAYING TRAFFIC FROM A SOURCE TO A TARGETED DESTINATION IN A COMMUNICATIONS NETWORK AND CORRESPONDING EQUIPMENT

CROSS-REFERENCE TO RELATED APPLICATIONS

This is a Continuation Application of pending prior U.S. application Ser. No. 10/697,121, filed Oct. 31, 2003, which claims benefit of European Patent Application No. 02360339.2, filed Dec. 9, 2002. The entire disclosures of the prior applications, application Ser. Nos. 10/697,121 and 02360339.2, are considered part of the disclosure of the accompanying continuation application and are hereby incorporated by reference.

TECHNICAL FIELD

The present invention relates to a method and a corresponding equipment which allow to simplify the management and/or the administrative effort in configuring a machine which is set up to provide a plurality of network connections.

The invention further relates to hardware and software equipment which are configured to implement such a method in a communications network environment.

The invention is based on a priority application, EP 02360339.2, which is hereby incorporated by reference.

BACKGROUND OF THE INVENTION

Such a method and the corresponding equipment are known from state of the art implementations for connecting a computer to communications networks, such as the internet. As an example, the assignee of the present invention distributes a product called PSS (Personal Service Selector) which uses at least two network adapters installed in a machine to provide access to a plurality of communications networks. The adapters may be either hardware adapters, such as Ethernet cards, or software implemented adapters, such as PPPoE adapters (Point-to-Point-Protocol over Ethernet). Likewise, there are operating systems for network client terminals, which operating systems are capable of dealing with a plurality of network adapters.

In the prior art systems, only one routing table is implemented in the machine. The routing table is some sort of a look-up table which is used by all network adapters in the decision process where an information packet has to be sent to next. The routing table typically comprises a plurality of line entries, each of which defining routing particulars for a certain destination or group of destinations. An example of a typical routing table, as it is used in prior art systems, is shown in FIG. 2 for illustrative purposes.

Each line entry typically comprises a destination address field and a mask field, the combination of which identifies a predefined destination or group of destinations. For each identified destination or group of destinations, a so-called next hop field and an interface field define where the information packets (the traffic) has to be relayed to. The next hop field defines the next intermediate destination on the way to the final targeted destination, the interface field defines the interface which is to be used on this route, for instance the network adapter to be used. Based on the entries in the routing table, the traffic is relayed along the route that provides the best match between the targeted destination and the predefined destinations identified in the destination and mask entries.

Typically, the routing table includes one default route which is chosen when no better match can be found among the specified destination entries (referred to as default situation in the following). If a plurality of destinations should be accessible along predefined routes and/or if for a specific destination different routes should be provided, a plurality of corresponding routing entries has to be included in the routing table. This applies particularly to cases, where different destinations should be reached simultaneously via different network adapters. However, the management of these entries becomes very complex when a network adapter is not statically configured for a specific destination or group of destinations. In addition, detailed knowledge about the network topology is required to establish an appropriate routing table in such a scenario.

SUMMARY OF THE INVENTION

In view of this background, it is an object of the present invention to provide a method of relaying traffic from a source to a targeted destination in a communications network, said method comprising the steps of:
  providing a first and at least one second network adapter each providing access to a network having a plurality of destinations,
  providing a first routing table which defines at least a first destination associated with the first network adapter, and
  relaying said traffic from the source to the targeted destination using one of the network adapters.

According to one aspect of the invention, this object is achieved by a method as mentioned at the outset, further comprising a step of providing at least one second routing table defining a second destination, which second destination is individually associated with said at least one second network adapter, wherein the step of relaying includes the step of selecting one of the first and second routing tables.

According to another aspect of the invention, this object is achieved by a network adapter for providing access to a network from a source, said network adapter comprising an individually associated routing table. According to a further aspect of the invention, a client terminal and a router are provided, each comprising a plurality of network adapters for providing access to a network and a plurality of routing tables, wherein each network adapter is individually associated with one of the routing tables. Moreover, an operating system component for connecting a source application running on a machine to a communications network is provided, the operating system component comprising a plurality of routing tables each configured to be individually associated with a network adapter of said machine. Even further, a computer software product comprising a computer program for implementing and configuring a plurality of routing tables is provided, wherein each routing table is to be associated with one of a plurality of network adapters accessible from a machine where the program is executed.

The new method and the corresponding equipment for the first time provide the possibility to use a plurality of network adapters, each of which being associated with a default destination in a routing table at the same time. Therefore, a plurality of network adapters can be used without preferences assigned to one of them. In other words, each network adapter is now capable of providing access to a communications network via a route from a selected routing table. It is hence much easier to manage different routes involving a plurality of network adapters. In particular, it is no longer necessary to specify all the details and alternatives for those routes that are associated with a network adapter other than the default adapter in one routing table. Of course, it is still possible to define details of alternative routes within each of the plurality of routing tables. However, it is no longer necessary to do so in order to use the multiplicity of network adapters.

The management of the routing tables is particularly simplified in scenarios where a plurality of source applications running on a machine want to access a plurality of destinations via different network adapters. Heretofore, only one network adapter could be used via a default route. For all other network adapters, the details of the routes had to be specifically included in the single routing table. Many backup or fallback positions had to be included in the single routing table in order to preserve all the routing possibilities if the default route should be changed in a certain situation. The resulting complex management of the prior art routing tables is eliminated now, because it is basically sufficient to define one default route for each network adapter. A source application trying to connect to a network simply uses one of the routing tables and its corresponding network adapter (which is preferably triggered by the source application itself), and it is possible to relay the traffic along the default destination route for many adapters at the same time.

Another advantage of the new approach is that detailed knowledge about the network topology is no longer needed for establishing several alternative routes for accessing one or more communications networks.

The above object is, therefore, completely achieved.

According to a preferred refinement, the first and second routing tables define said first and second destinations as default destinations which are used for traffic relay in any default situation.

Use of the concept of default destinations in a plurality of routing tables even more facilitates the management of a large number of routes via different network adapters. It goes without saying, however, that the routing table can additionally comprise specific destinations for establishing alternative routes, if desired.

In a further preferred refinement, at least some of the first and second routing tables comprise specific destinations pointing to another routing table.

As mentioned above, use of a plurality of routing tables does not render impossible to specify and use alternative routes defined within one or more of the plurality of routing tables. Implementing these specific destinations provides a quicker and easier "escape" route in cases where the default route does not work for whatever reason. The amount of specific destinations in each routing table, and hence the amount of specific destinations in the routing tables at all, can nevertheless be greatly reduced compared to the prior art approach using only one routing table for a plurality of network adapters.

Following the preferred approach, an escape route can easily be defined by pointing to another routing table, thereby using the default route of the latter as a main choice for the escape route. Therefore, in a very consequent and easy implementation of the new approach, it is sufficient to define a default route in each routing table and a limited number of specific escape routes pointing to another routing table. No detailed knowledge about the network topologies is required for establishing these kinds of routing tables. The management effort is greatly reduced.

According to a further preferred refinement, the specific destination in the selected routing table(s) points to the escape routing table as a next hop entry.

This approach provides an easy but effective way to implement connections between the plurality of routing tables without the need of making considerable changes in the way that a routing table is used for determining a route for traffic relay. The next hop entries are commonly known and used as intermediate destinations in prior art systems. Establishing the (escape) referrals from one routing table to another in the next hop entries makes efficient use of existing system structures.

According to yet another preferred refinement, the step of providing network adapters includes providing real network adapters and providing at least one virtual network adapter, wherein the virtual network adapter is individually associated with a third routing table.

Introducing virtual network adapters even more increases the flexibility of managing the information flow to and from a source application, because it is possible now to define even more routing tables than real adapters are present in the machine.

Preferably, the third routing table includes next hop and interface entries pointing to at least one of the following: another routing table or a real network adapter, and the step of relaying uses the at least one virtual network adapter and its associated routing table.

The source application now only needs to communicate with the virtual network adapter, which can be freely configured and adapted to different situations. The structure behind the virtual adapter is independent of the source application. The source applications are hence better shielded from intricacies on the connection level. Furthermore, an even more enhanced plurality of connection routes can be provided by defining different virtual adapters each having an associated routing table with a (default) destination route. The system configuration effort is particularly reduced in cases where a plurality of different networks is to be accessed by a plurality of source applications at the same time.

According to another preferred refinement, the step of selecting a routing table is triggered by the source.

This idea greatly increases flexibility and adaptability in using the different routes, because it is now under control of the source which route is selected. On the other hand, this flexibility is provided without the need of providing the source with detailed knowledge about the network topology.

It goes without saying that the features described above and those yet to be explained below cannot be used in the disclosed combination only, but also in other combinations, as will be apparent to those skilled in the art.

BRIEF DESCRIPTION OF THE DRAWINGS

With respect to the following description, it is shown in.

DETAILED DESCRIPTION OF THE DRAWINGS

Figure 1:
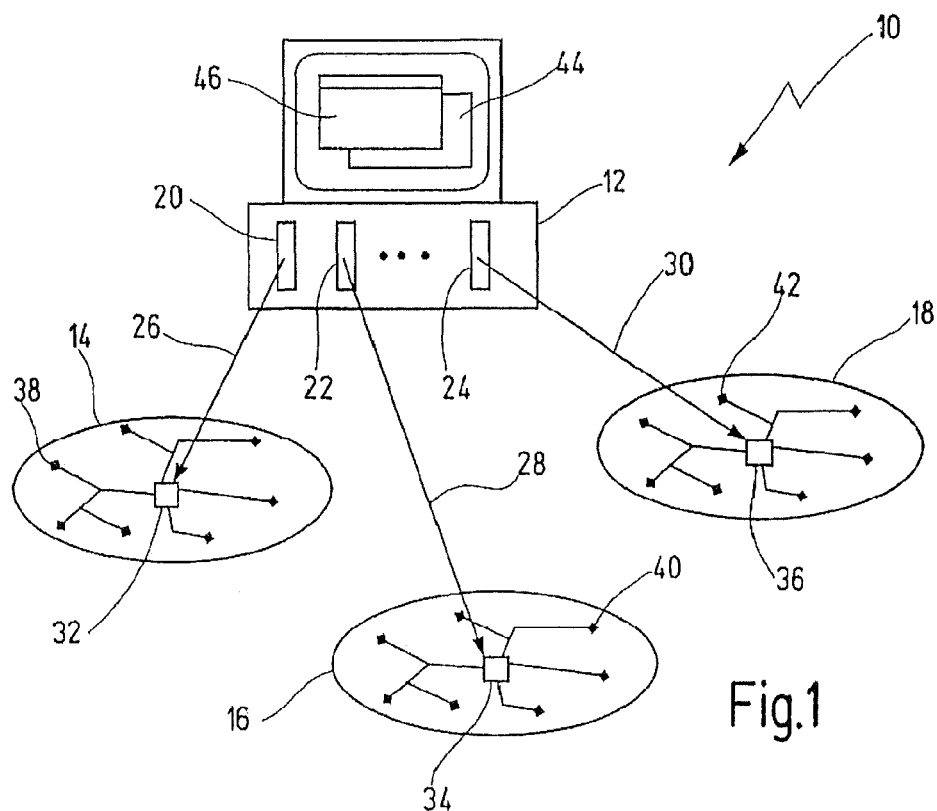
FIG. 1 a simplified, schematic illustration of a client terminal connected to a plurality of communication networks according to one embodiment of the invention, FIG. 2 a schematic illustration of a prior art method for relaying traffic in an environment similar to that as shown in FIG. 1, FIG. 3 a schematic representation of a method according to a first embodiment of the invention, and FIG. 4 a schematic representation of another embodiment of the invention.

In FIG. 1, reference numeral 10 designates an environment in which the present invention can be applied. The environment 10 comprises by way of non-limiting example a client terminal 12 and a plurality of isolated networks 14, 16, and 18. The client terminal 12 includes a plurality of network adapters 20, 22, and 24, each of which can be implemented either as hardware (e.g. as an Ethernet card adapter) or as software based on a hardware (e.g. as a PPPoE adapter). The network adapters 20, 22, 24 allow the client terminal 12 to access the networks 14, 16, 18, which is indicated by arrows 26, 28, 30 in FIG. 1. Thus, network adapters 20, 22, 24 are real network adapters in the sense of the present invention.

The networks 14, 16, 18 each comprise an access point 32, 34, 36, which might be a server or a router or any other suitable device allowing a connection from network adapters 20, 22, 24. A plurality of destinations 38, 40, 42 are connected to the access points 32, 34, 36, which destinations might be other servers, routers, client terminals or the like. Basically, the networks 14, 16, 18 may be any kind of communications networks that can be accessed from a client terminal 12.

With reference numeral 44, an operating system component is schematically illustrated. The operating system component 44 is part of the operating system running on client terminal 12, as it is basically known to those skilled in the art.

With reference numeral 46, a source application is schematically indicated. Source application 46 is running on the client terminal 12 using functionality that is provided by the operating system. By way of example, the source application 46 might be an internet browser, the client terminal 12 is a personal computer (PC) having the plurality of network adapters 20, 22, 24 implemented, and the operating system component comprises a functionality that implements the new method in a way described in further detail below.

The networks 14, 16, 18 might be isolated from each other, as is shown in FIG. 1 according to one embodiment of the invention. However, it is generally also feasible that the networks 14, 16, 18 are connected among each other, thereby defining an overall network having physical and/or logical sub-networks. It is also possible that the networks 14, 16, 18 form part of an overall network without any differences, such that the client terminal 12 is actually connected to one integral network via different network adapters. By way of example, network 14 may be a network accessible via a high-speed connection for providing video-on-demand services. Network 16 may be the public switched telephone network (PSTN). Connection to network 16 is achieved then via a medium or low speed connection. Network 18 might be an intranet based on common LAN technology.

Figure 2:
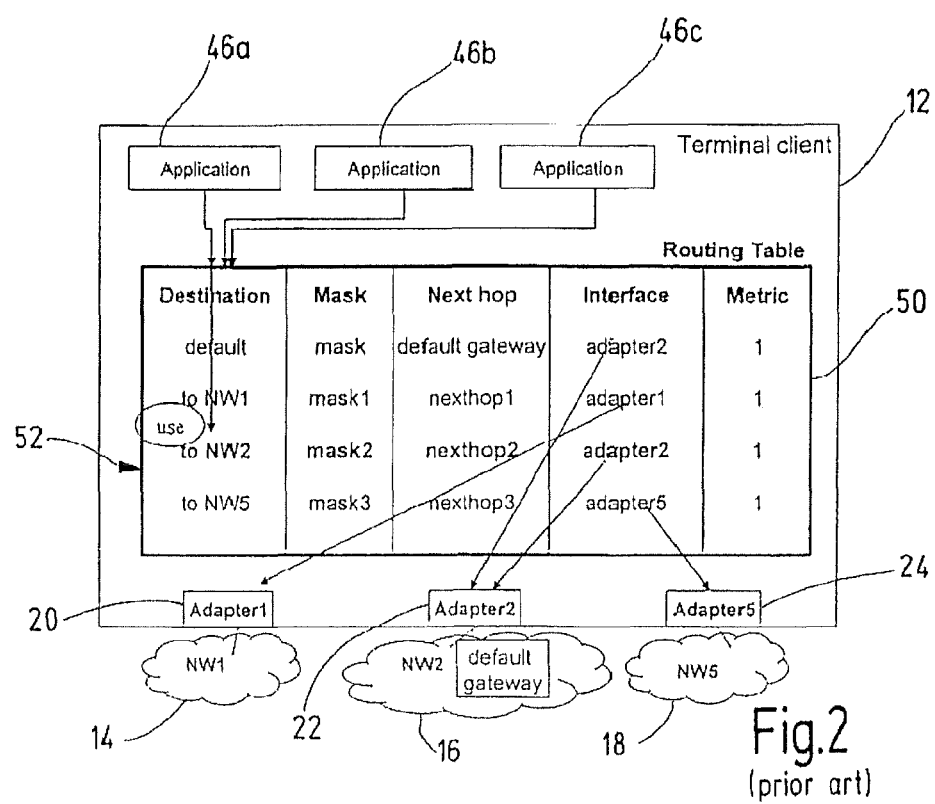

In FIG. 2, a prior art method for accessing networks 14, 16, 18 from a client terminal 12 is schematically shown. It is assumed that several applications run on the client terminal 12, which are distinguished here by reference numerals 46*a*, 46*b*, and 46*c*. Application 46*a* might be a program for displaying a video received from network 16, while application 46*b* is the internet browser already indicated above. 46*c* might designate any other application requiring access to one of the networks 14, 16, 18.

According to the prior art method, a single routing table 50 is used to establish connections between applications 46 and destinations 38, 40, 42 within the networks 14, 16, 18. The routing table 50 comprises a plurality of line entries 52, and each line entry 52 defines the details of a particular route for connection. The structure and use of routing tables 50 like this are sufficiently known to those skilled in the art.

As it is known to those skilled in the art, routing table 50 defines a default route (default destination), which is automatically chosen when no better match exists between the targeted destinations 38, 40, 42 and the specified destinations defined by specified address entries 52 in routing table 50 (default situation). Therefore, an information packet, which is to be sent from client terminal 12 to a targeted destination 38, 40, 42, is relayed to the default destination, unless a better match between the targeted destination address and one of the specific destination entries in routing table 50 can be found.

Since there is only one default route in routing table 50, only one of network adapters 20, 22, 24 can be associated therewith. For the remaining network adapters, specific destination entries have to be made in routing table 50. Moreover, it is often favorable to include specific destination entries for all the network adapters 20, 22, 24, in order to preserve all the connection information, if the default destination route is changed, which might occur, for instance, under control of applications 46. It is apparent that the management of line entries 52 in routing table 50 can become cumbersome, in particular in cases where a plurality of applications simultaneously try to access a plurality of networks via different network adapters.

In the following description of preferred embodiments of the invention, like reference numerals designate elements already explained with respect to FIGS. 1 and 2.

Figure 3:
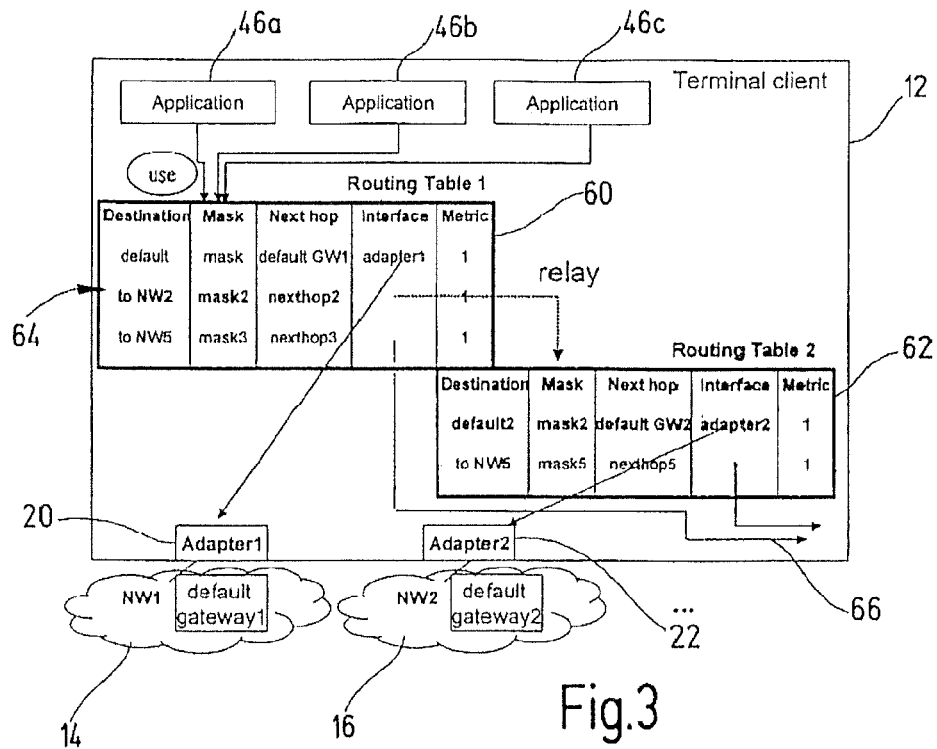

FIG. 3 shows an embodiment of the new method in a representation similar to that of FIG. 2. Quite in contrast to the prior art, however, the new method now employs a plurality of routing tables, with two routing tables 60, 62 shown here by way of example. Each routing table 60, 62 is individually associated with one of network adapters 20, 22, 24, and it preferably names the respective network adapter in the interface field of its corresponding default destination route. Therefore, each network adapter can be accessed from an application 46 as a default destination route by selecting the appropriate routing table 60, 62.

According to a preferred embodiment, routing tables 60, 62 further include specific destination entries 64 which, in an even more preferred embodiment, each refer to another routing table in the next hop field. Thereby, it is easily possible to provide an escape route if the targeted destination cannot be reached via the network adapter default route in the selected routing table. In FIG. 3, it is shown how applications 46 first chose routing table 60 for making a connection to one of networks 14, 16, 18. If the targeted destination lies within network 14, the default route defined in routing table 60 is appropriate and the connection is established via network adapter 20. However, if the targeted destination is in network 16, it cannot be reached via network adapter 20. As an escape route, the connection is relayed via routing table 62 by means of specific destination entry 64 referring to routing table 62 in the next hop field. Likewise, if another network is to be accessed, routing table 60 refers to yet another routing table (not shown here for sake of simplicity), as it is indicated by arrow 66.

FIG. 3 shows a situation where all applications 46 firstly use routing table 60, which might be defined as a default routing table in the operating system underlying applications 46. In another embodiment, however, applications 46 individually select an appropriate routing table, for instance by displaying a selection field to the user, if appropriate. Additionally, appropriate selection of the most suitable routing table might be configured by a user in profile definitions, as it is already known in the art.

Figure 4:
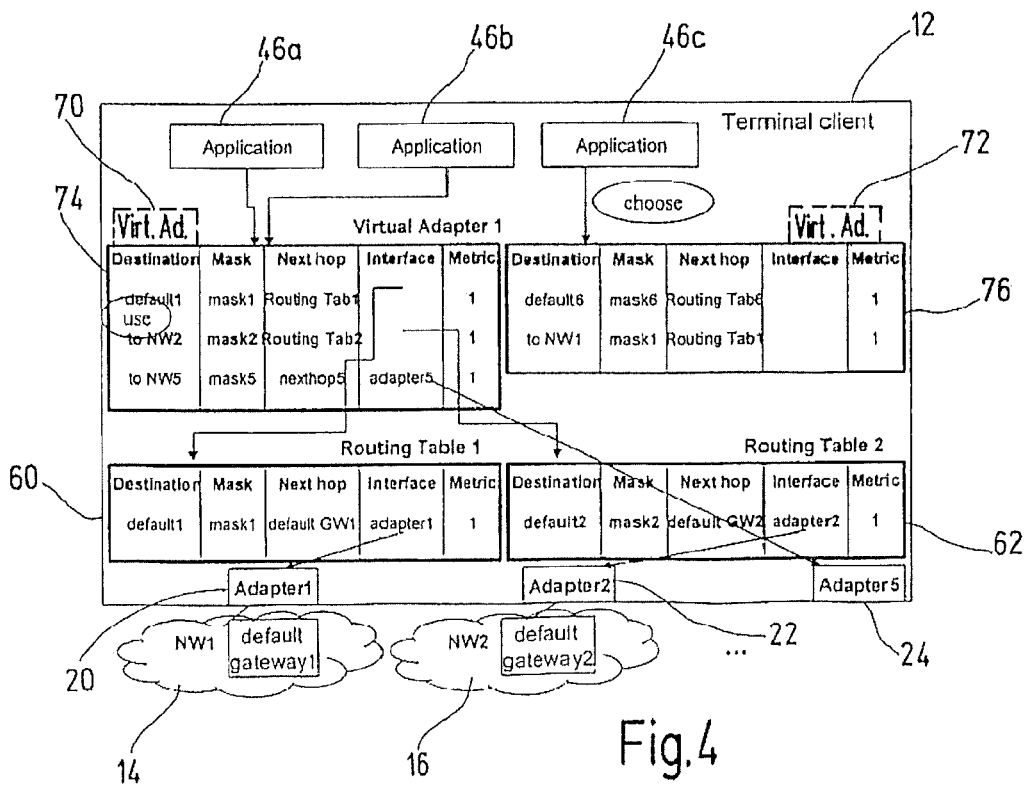

In the embodiment shown in FIG. 4, the concept of using a plurality of routing tables is still maintained. Additionally, however, virtual network adapters 70, 72 having associated routing tables 74, 76 are introduced. In the preferred embodiment shown in FIG. 4, applications 46 dynamically select a virtual adapter 70, 72 for making a connection to one of networks 14, 16, 18. By means of associated routing tables 74, 76, the virtual adapters 70, 72 then refer to an appropriate routing table 60, 62 associated with one of real network adapters 20, 22, 24. Alternatively, the routing tables 74, 76 of the selected virtual adapter might also directly refer to a real adapter, as it is shown by means of virtual adapter 74 and real adapter 24.

By introducing the concept of virtual adapters 70, 72, preferably all the communication is routed via the virtual adapters. The routing tables 74, 76 associated with each virtual adapter 70, 72 refer in the next hop and interface fields either to other routing tables 60, 62 associated with a specific real adapter 20, 22 or to the real adapters 20, 22 themselves. In other words, the complete traffic is mediated then using the virtual adapters routing tables 74, 76. If a group of applications 46 wants to use the same real adapters for reaching a targeted destination, they can chose the same virtual adapter. However, applications that want to use different real adapters for reaching the same destinations simply chose different virtual adapters. This concept provides an increased flexibility in establishing network connections, while it still keeps the management effort low due to the possibility of using default destination entries for making the connections.

The invention claimed is:

1. A method of relaying traffic from a source to a targeted destination in a communications network, said method comprising the steps of:
   providing a first and at least one second network adapter each providing access to a network having a plurality of destinations;
   providing a first routing table which defines a first default destination individually associated with the first network adapter, such that the first network adapter is listed as an interface for the first default destination;
   providing at least one second routing table defining a second default destination, wherein the second default destination is individually associated with the at least one second network adapter, such that the at least one second network adapter is listed as an interface for the second default destination; and
   relaying said traffic from the source to the targeted destination using one of the network adapters, wherein the step of relaying further comprises selecting one of the first or second routing tables, such that by selecting the first routing table, the first network adapter is accessed as a default destination route, and by selecting the second routing table, the second network adapter is accessed as a default destination route.

2. The method of claim 1, wherein at least some of the first and second routing tables comprise specific destinations pointing to another routing table, preferably by means of a next hop entry.

3. The method of claim 2, wherein each of the first and second routing tables comprise specific destinations that only point to another routing table.

4. The method of claim 1, wherein the step of providing network adapters includes providing real network adapters and providing at least one virtual network adapter, wherein each virtual network adapter is individually associated with a third routing table.

5. The method of claim 4, wherein the third routing table includes next hop and interface entries pointing to at least one of the following: another routing table or a real network adapter, and wherein the step of relaying uses the at least one virtual network adapter and its associated third routing table.

6. The method of claim 1, wherein the step of selecting a routing table is triggered by the source.

7. A network adapter for providing access to a network from a source, said network adapter comprising an individually associated routing table where the network adapter is an interface for a default destination route for the source to access the network adapter as the default destination route, 
   wherein a routing table defines a default destination individually associated with the network adapter, and
   wherein, when relaying traffic from the source, the routing table is selected such that the network adapter is accessed as the default destination route.

8. The network adapter of claim 7, said network adapter being a virtual adapter, said individually associated routing table comprising next hop and interface entries pointing to at least one of the following: another routing table or a real network adapter.

9. A client terminal comprising a plurality of network adapters for providing access to a network and a plurality of routing tables, wherein each individual network adapter is individually associated with one of the plurality of routing tables, such that each individual network adapter is an interface for a default destination of its associated routing table, and wherein a first routing table and a second routing tables define a first destination and a second destination as a first default destination and a second default destination, respectively, which are used for traffic relay, and wherein, when traffic is relayed from a source to a target destination, at least one from among the first routing table and the second routing table is selected, such that a first network adapter is accessed as a first default destination route if the first routing table is selected and a second network adapter is accessed as a second default destination route if the second routing table is selected.

10. A router for relaying traffic from a source to a targeted destination in a communications network, comprising a plurality of network adapters for providing access to the communications network and a plurality of routing tables, wherein each individual network adapter is individually associated with one of the plurality of routing tables, such that each individual network adapter is an interface for a default destination of its associated routing table, and wherein a first routing table and a second routing table define a first destination and a second destination as a first default destination and a second default destination, respectively, which are used for traffic relay, and wherein, when traffic is relayed from the source to the targeted destination, at least one from among the first routing table and the second routing table is selected, such that a first network adapter is accessed as a first default destination route if the first routing table is selected and a second network adapter is accessed as a second default destination route if the second routing table is selected.

11. A system for relaying traffic from a source to a target destination in a communications network, comprising an operating system component configured to connect a source application running on a machine to a communications network, wherein the operating system component comprises a plurality of routing tables, each configured to be individually associated with one of a plurality of network adapters of said machine, wherein each of the plurality of routing tables defines a destination as a default destination, which is used for traffic relay, such that each individual network adapter is an interface for the default destination of its associated routing table, and wherein at least one from among the plurality of routing tables is selected such that the network adapter individually associated thereto is accessed as the default destination route.

12. The system of claim 11, wherein the operating system component further comprises a plurality of virtual network adapters, each virtual network adapter being associated with one from a plurality of third routing tables and each associated third routing table comprising next hop and interface entries pointing to at least one of the following: another routing table or a real network adapter.

13. The system of claim 11, further embodied as a computer program product on a non-transitory computer readable medium comprising:
   computer code for connecting the source application to the communications network; and
   computer code for configuring the plurality of routing tables to be individually associated with the network adapter of said machine.

14. A non-transitory computer readable storage medium comprising computer code for implementing and configuring a plurality of routing tables each to be individually associated with one of a plurality of network adapters accessible from a machine, such that each individual network adapter is listed as an interface for a default destination of its associated routing table, wherein the computer code is operable for relaying traffic from a source to a target destination in a communications network, and wherein each of the plurality of routing tables defines a destination as the default destination, which is used for traffic relay, and wherein, when relaying traffic from a source, the routing table is selected such that the network adapter is accessed as the default destination route.

* * * * *